(No Model.)
M. D. RUCKER & G. P. MILLS.
WHEEL FOR CYCLES.
No. 514,965. Patented Feb. 20, 1894.
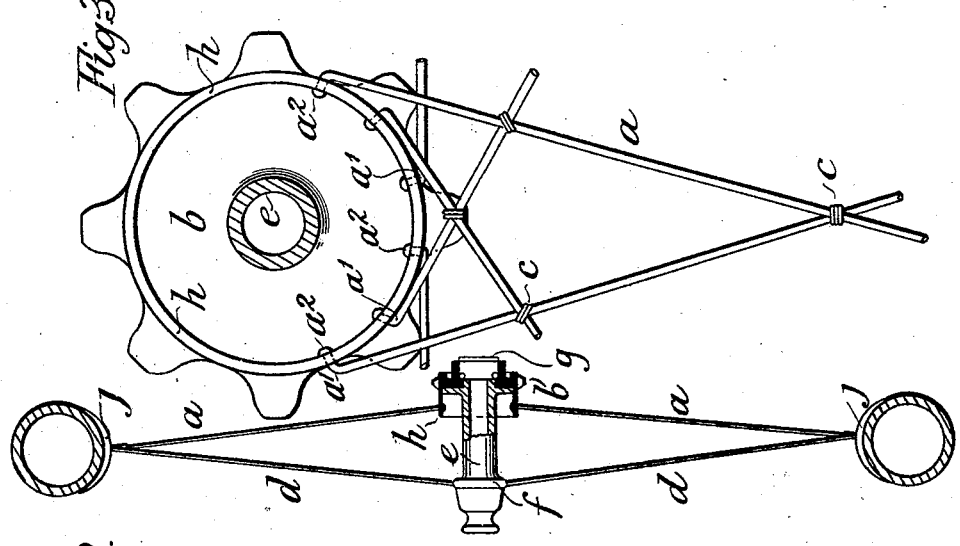
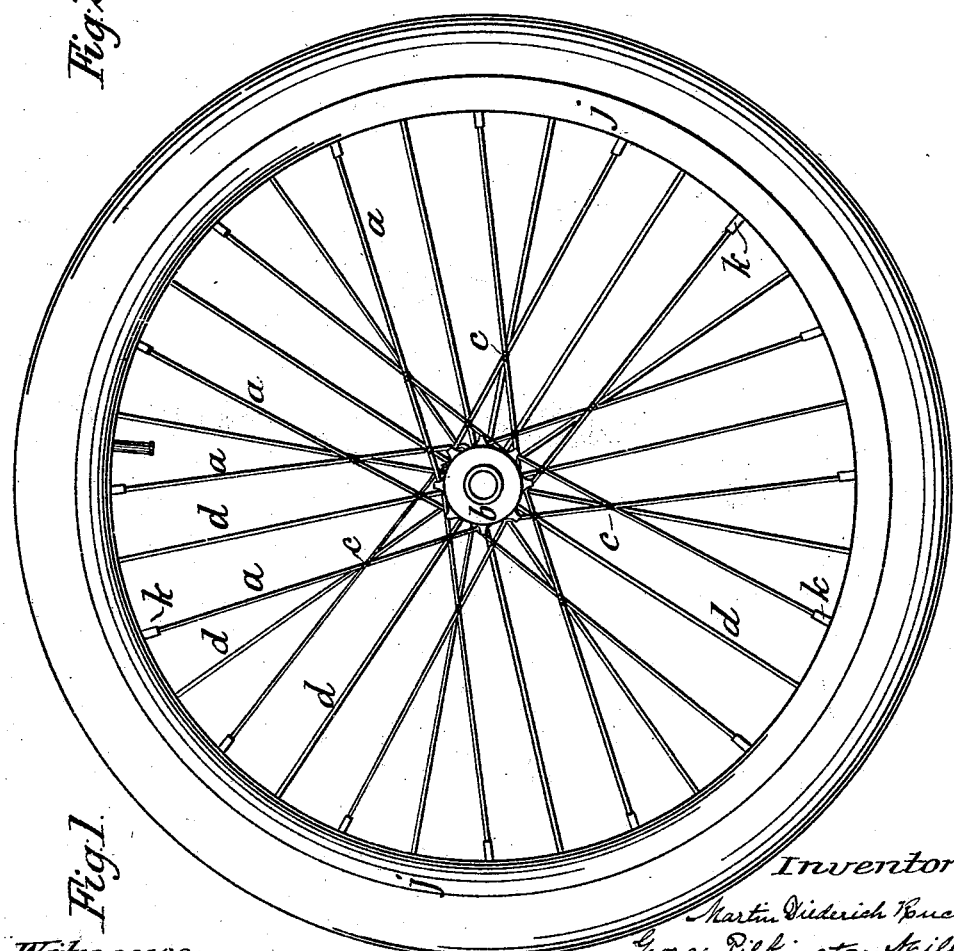

UNITED STATES PATENT OFFICE.

MARTIN DIEDERICH RUCKER, OF LONDON, AND GEORGE PILKINGTON MILLS, OF BEESTON, ENGLAND.

WHEEL FOR CYCLES.

SPECIFICATION forming part of Letters Patent No. 514,965, dated February 20, 1894.

Application filed September 7, 1893. Serial No. 484,978. (No model.) Patented in England February 17, 1893, No. 3,728.

*To all whom it may concern:*

Be it known that we, MARTIN DIEDERICH RUCKER, residing at London, and GEORGE PILKINGTON MILLS, residing at Beeston, Nottingham, England, subjects of the Queen of Great Britain and Ireland, have invented new and useful Improvements in Wheels for Cycles and Similar Vehicles, of which the following is a specification.

This invention has been provisionally patented in Great Britain under date February 17, 1893, No. 3,728.

Our invention relates to improvements in the wheels of bicycles, safeties, tricycles and similar vehicles, whereby the wheel is made of light construction and the spokes are not liable to cut or shear off above the flanges of the hub, the manufacture being cheaper than is the case with the wheels as hitherto constructed.

For the purpose of our invention we construct or build up the wheel with tangent spokes on the driving side thereof, and with direct or radial spokes on the other side. By this arrangement the direct or radial spokes do not take the driving strain, but serve only to hold the wheel together. The flange or portion of the hub of the driving wheel which is next the cog or gear wheel is constructed suitably to receive the tangent spokes, the other portion or flange being made to suit radial spokes. The hub can be made as light as for a wheel having all the spokes at a tangent, and the difficulty and expense of making a tangent-spoke front wheel to match a tangent-spoke back wheel are avoided. The spokes are secured to the rim in any well known manner. And in order that our invention may be readily understood we will describe the same fully with reference to the accompanying drawings which show a cycle wheel constructed in accordance therewith.

Figure 1, is a side elevation of a driving wheel for cycles. Fig. 2, is a vertical section of the same with the hub partly in elevation, and Fig. 3, is a side elevation, to a larger scale, of that end of the hub to which the tangent spokes are secured.

$a, a$, are the tangent spokes at that side of the wheel which carries the chain wheel $b$, or other driving mechanism; they are arranged at a tangent to the hub for the purpose of obtaining a direct tensile strain in them by the act of driving. These tangent spokes $a, a$, are bent at their inner ends $a', a'$, and are provided with heads $a^2, a^2$, by means of which they are secured to the drum or flange of the hub. Or a flange, separate from the chain wheel, may be formed on the hub for the attachment of the tangent spokes, in any suitable and well known manner; or teeth or projections may be formed on the hub through which the spokes may be passed, or threaded; or any other form of flange suitable for tangent spokes may be employed. The tangent spokes $a, a$, may be laced at the points where they cross each other by fine wires $c, c$, in the usual manner.

$d, d$, are the direct or radial spokes which are secured in position by heads in the rim and by being screwed into the hub, or in any other suitable and well known manner.

We have shown in the drawings sixteen tangent spokes $a, a$, at one side of the wheel, and sixteen direct or radial spokes $d, d$, at the other side, but we do not limit ourselves to any particular number of spokes, nor do we limit ourselves to any particular method of securing them to the hub, or to the rim, as these will vary with the size and design of the cycle, or like vehicle, to which the invention is applied.

The hub $e$ is constructed at one end with a flange $f$, or its equivalent, for the reception of the radial spokes $d$, the other end $g$ of said hub being provided with a light drum or flange $h$, preferably formed on the chain-wheel $b$, or driving device, and through which the bent ends $a', a'$, of the tangent spokes pass. The other ends of these tangent spokes are secured to the rim $j$ by nipples $k$, or in any other usual manner.

With wheels constructed according to our invention the liability of the spokes to break is reduced to a minimum.

Although we have described and shown our invention as applied to a wheel for cycles, it may be applied, in like manner, to wheels for similar vehicles.

Having described our invention, we claim and desire to secure by Letters Patent—

1. The construction of driving wheels for cycles, and similar vehicles, with tangent spokes at the driving or chain-wheel side, and with direct or radial spokes at the other or opposite side, substantially as set forth.

2. In cycle and like wheels, a hub having one end or flange tapped for the reception of direct or radial spokes, and the other end constructed to form the chain wheel, or driving mechanism, and provided with a flange, or its equivalent, for attachment of tangent spokes, substantially as hereinbefore described.

3. The combination with a driving wheel for cycles, and similar vehicles, having tangent spokes on the driving or chain-wheel side, and direct or radial spokes on the opposite side, of a hub having one end provided with a flange or drum to receive the tangent spokes, and the other end formed to receive the direct or radial spokes, substantially as set forth.

In witness whereof we have hereunto signed our names in the presence of two subscribing witnesses.

MARTIN DIEDERICH RUCKER.
GEORGE PILKINGTON MILLS.

Witnesses:
 EWARD W. CASS,
  78 Hill Street, London.
 W. M. HARRIS,
  17 Gracechurch Street, London.